(12) United States Patent
Cornell

(10) Patent No.: US 8,744,650 B1
(45) Date of Patent: Jun. 3, 2014

(54) AIRCRAFT CONTROL SYSTEM

(75) Inventor: Bradley D. Cornell, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 306 days.

(21) Appl. No.: 13/050,234

(22) Filed: Mar. 17, 2011

(51) Int. Cl.
*G05D 1/10* (2006.01)
*G01C 23/00* (2006.01)

(52) U.S. Cl.
CPC .............. *G05D 1/101* (2013.01); *G01C 23/00* (2013.01)
USPC ................................................. 701/4; 701/14

(58) Field of Classification Search
USPC .............................. 701/3, 14, 36, 48; 340/971
See application file for complete search history.

(56) References Cited

U.S. PATENT DOCUMENTS

| | | | | |
|---|---|---|---|---|
| 5,475,594 A | * | 12/1995 | Oder et al. | 701/14 |
| 5,790,791 A | | 8/1998 | Chong et al. | |
| 5,916,297 A | * | 6/1999 | Griffin et al. | 701/14 |
| 6,057,786 A | * | 5/2000 | Briffe et al. | 701/4 |
| 6,112,140 A | * | 8/2000 | Hayes et al. | 701/14 |
| 6,112,141 A | * | 8/2000 | Briffe et al. | 701/14 |
| 6,381,519 B1 | * | 4/2002 | Snyder | 701/3 |
| 6,597,294 B1 | * | 7/2003 | Ariens | 701/14 |
| 6,633,801 B1 | * | 10/2003 | Durlacher et al. | 701/14 |
| 6,696,980 B1 | * | 2/2004 | Langner et al. | 701/14 |
| 6,832,138 B1 | * | 12/2004 | Straub et al. | 701/14 |
| 6,842,672 B1 | * | 1/2005 | Straub et al. | 701/3 |
| 7,012,553 B2 | * | 3/2006 | Hedrick | 340/971 |
| 7,321,318 B2 | * | 1/2008 | Crane et al. | 340/971 |
| 7,698,025 B1 | | 4/2010 | Cornell et al. | |

* cited by examiner

*Primary Examiner* — Helal A Algahaim
*Assistant Examiner* — Dale W Hilgendorf
(74) *Attorney, Agent, or Firm* — Yee & Associates, P.C.

(57) ABSTRACT

A method and apparatus comprising a bus system and a plurality of control units connected to the bus system. The plurality of control units are each configured to control a same number of hardware systems in a vehicle, store a number of parameters used to control the number of hardware systems, and synchronize the number of parameter stored using the bus system in response to a change in the number of parameters at a selected control unit in the plurality of control units.

20 Claims, 12 Drawing Sheets

AIRCRAFT CONTROL SYSTEM

BACKGROUND INFORMATION

1. Field

The present disclosure relates generally to aircraft and, in particular, to controlling operation of systems in aircraft. Still more particularly, the present disclosure relates to a method and apparatus for controlling multiple systems in aircraft.

2. Background

Aircraft commonly use dedicated control panels along with display devices for interacting with different systems in the aircraft. These systems may include, for example, without limitation, a voice radio system, a navigation system, a weather radar transponder, a ground proximity warning system, a satellite communications system, a cabin intercom system, a flight management computer, and/or other types of systems.

Typically, a dedicated control panel in an aircraft comprises a number of control buttons, knobs, switches, dials, and/or other mechanisms for interacting with a particular system on the aircraft. In other words, a dedicated control panel is configured to interact with a particular system and not other systems. For example, a control panel dedicated to a navigation system is typically configured to provide interaction with the navigation system and not other systems in the aircraft.

These dedicated control panels may be used with display devices, such as monitors, display screens, and/or other suitable display devices for interacting with the different systems in the aircraft.

With this type of setup, the number of different control panels and/or display devices used for interacting with the different systems increases the weight and complexity of the aircraft. For example, in addition to needing additional control panels and display devices, an increase in the number of wiring bundles used in the aircraft also increases.

Additionally, these dedicated control panels and display devices take up space or real estate within the cockpit and other control areas of the aircraft. The space used for these dedicated control panels and display devices may affect the size of the cockpit or other areas in an aircraft. Further, the placement of these dedicated control panels and display devices may not provide a desired level of ergonomics for the different operators of the aircraft.

Therefore, it would be advantageous to have a method and apparatus that takes into account at least some of the issues discussed above, as well as other possible issues.

SUMMARY

In one advantageous embodiment, a control system for an aircraft comprises a first control display unit and a second control display unit. The first control display unit is configured to control a number of hardware systems in the aircraft. The second control display unit is configured to control the number of hardware systems in the aircraft. The second control display unit is in communication with the first control display unit. A number of parameters for a hardware system in the number of hardware systems is stored in the first control display unit and in the second control display unit. The first control display unit and the second control display unit are configured to synchronize the number of parameters stored in the first control display unit and the second control display unit.

In another advantageous embodiment, an apparatus comprises a bus system and a plurality of control units connected to the bus system. The plurality of control units are each configured to control a same number of hardware systems in a vehicle, store a number of parameters used to control the number of hardware systems, and synchronize the number of parameters stored using the bus system in response to a change in the number of parameters at a selected control unit in the plurality of control units.

In yet another advantageous embodiment, a method is provided for operating an aircraft. Data is received at a field in a control display unit configured to control a number of hardware systems in the aircraft. The control display unit is currently controlling a first hardware system in the number of hardware systems. The data is sent to a number of control display units in response to receiving the data in the field at the control display unit. The number of control display units is configured to control the number of hardware systems for the aircraft. The data is displayed at the number of control display units in response to receiving the data from the control display unit. In response to receiving a user input at one of the number of control display units to use the data displayed at the number of control display units with a second hardware system in the number of hardware systems, the data is used with the second hardware system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
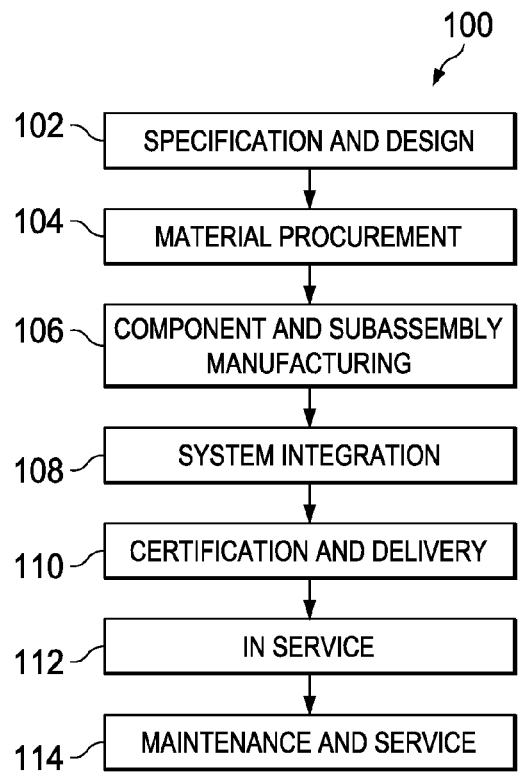
FIG. 1 is an illustration of an aircraft manufacturing and service method in accordance with an advantageous embodiment.
Figure 2:
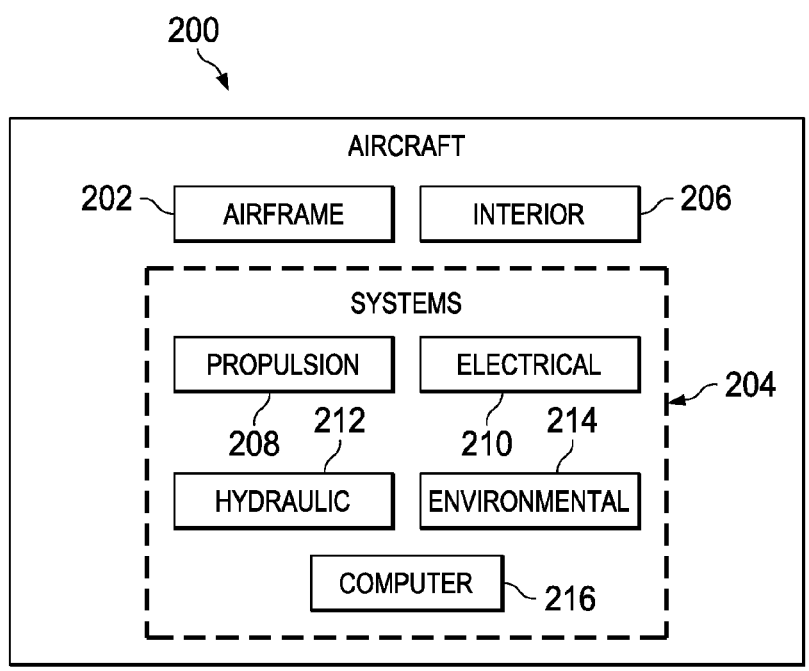
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, environmental system 214, and computer system 216. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 for different advantageous embodiments may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially increase efficiency in the operation of aircraft 200.

The different advantageous embodiments also recognize and take into account a number of different considerations. For example, the different advantageous embodiments recognize and take into account that it would be desirable to reduce the number of control panels and display devices used in an aircraft.

The different advantageous embodiments recognize and take into account that by reducing the number of control panels and display devices used in an aircraft, savings in weight and expense may occur. The different advantageous embodiments recognize and take into account that one manner in which the control panels and display devices may be reduced is configuring the control panels and/or display devices to handle multiple functions. For example, the control panels may be designed to control more than one hardware system in an aircraft. These types of control panels also may be referred to as multi-function control panels.

Further, the different advantageous embodiments recognize and take into account that a control panel and display device may be combined in the form of a control display unit. The control panel is hardware that is configured to provide an interface to an operator to interact with one or more systems in a platform, such as an aircraft. The display a hardware device that is configured to display information to the operator.

The control display unit may include, for example, without limitation, a monitor, a display screen, a touchscreen, buttons, knobs, switches, dials, a touch pad, a keyboard, and/or other mechanisms that may be used for interacting with systems on an aircraft. Using control display units that are configured to handle multiple functions for multiple systems in an aircraft may reduce the number of control panels and/or display devices in the aircraft.

Additionally, when a smaller number of control display units is present, the placement of these control display units may be performed in a manner that increases the ergonomics for operators of the aircraft. For example, the different advantageous embodiments recognize and take into account that by reducing the number of control display units, those control display units may be placed such that an operator may not need to turn their head and/or torso to see or operate a control display unit.

The different advantageous embodiments also recognize and take into account that one or more control display units may be present for redundancy. For example, one control display unit may be active, while other control display units remain inactive. The other control display units may be activated if the currently-used control display unit does not operate as desired.

The different advantageous embodiments recognize and take into account that, in some cases, this type of arrangement of control display units may only allow a single operator to perform operations with the active control display unit, while the other control display units are inactive. As a result, additional control display units may be used to provide other operators a capability to perform operations. As a result, the number of control display units in an aircraft still may be higher in number and take up more space than desired, even if these control display units are configured to control multiple hardware systems in the aircraft.

Thus, the different advantageous embodiments provide a method and apparatus for a control system for an aircraft. In one advantageous embodiment, an apparatus comprises a bus system and a plurality of control units connected to the bus system. The plurality of control units is configured to control a same number of hardware systems in a vehicle. The plurality of control units also may store a number of parameters used to control the number of hardware systems and synchronize the number of parameters stored using the bus system. This synchronization may occur in response to a change in the number of parameters at a selected control unit in the plurality of control units.

In these illustrative examples, the plurality of control units may take the form of control display units, such as those used in aircraft. Of course, these control units may be used in other types of vehicles other than aircraft.

Figure 3:
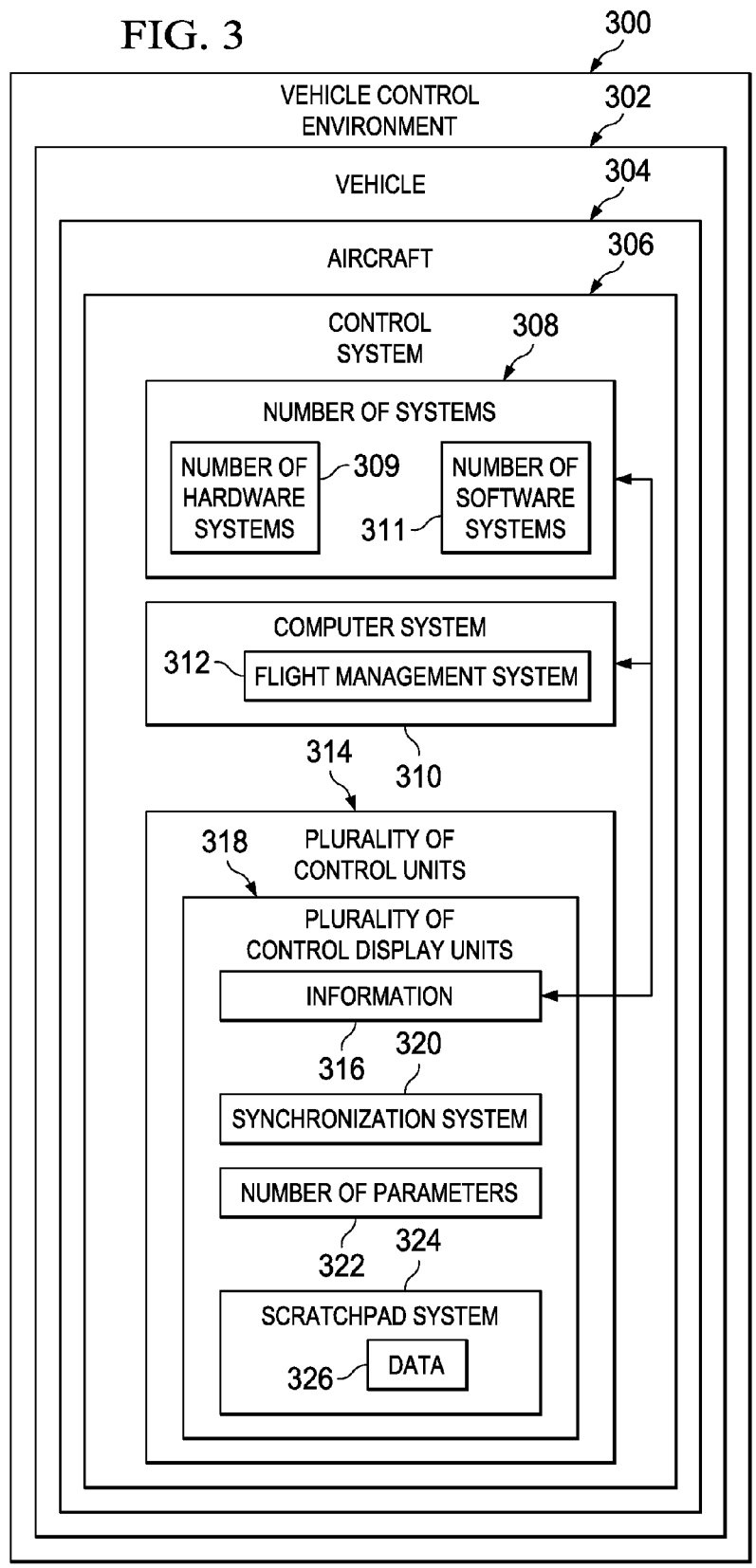
FIG. 3 is an illustration of a block diagram for a vehicle control environment in accordance with an advantageous embodiment.

With reference now to FIG. 3, a vehicle control environment is depicted in accordance with an advantageous embodiment. Vehicle control environment 300 includes vehicle 302. In these illustrative examples, vehicle 302 may take a number of different forms, such as aircraft 304. Aircraft 304 may be implemented using, for example, aircraft 200 in FIG. 2.

In this depicted example, control system 306 is configured to control number of systems 308 in control system 306. In these illustrative examples, number of systems 308 may take a number of different forms. Number of systems 308 may be number of hardware systems 309, number of software systems 311, or a combination of the two. For example, without limitation, number of systems 308 may include at least one of a propulsion system, a hydraulic system, an environmental system, an entertainment system, a radio voice communication system, a satellite communication system, a weather radar system, a ground proximity warning system, a cabin intercom system, and/or other suitable types of systems.

Control system 306 also may include computer system 310. Computer system 310 comprises a number of computers that may be in communication with each other. In this illustrative example, computer system 310 may include flight management system 312. Flight management system 312 is configured to provide in-flight management of a flight plan for aircraft 304.

In these illustrative examples, control system 306 includes plurality of control units 314. Plurality of control units 314 is configured to provide an operator interaction with number of systems 308 and computer system 310. For example, plurality of control units 314 may be used to send information 316 to number of systems 308 and computer system 310. In these illustrative examples, information 316 may be at least one of commands, data, programs, and/or other types of information. Each control unit within plurality of control units 314 is configured to provide interaction with respect to number of systems 308 and computer system 310.

Plurality of control units 314 may take the form of plurality of control display units 318. In this form, plurality of control units 314 also may display information 316 to operators. Additionally, plurality of control display units 318 provides an operator a capability to input information 316 for use in controlling number of systems 308 and computer system 310.

Further, plurality of control display units 318 also provides output to an operator as part of providing the operator interaction with number of systems 308. For example, parameters set for systems, weather information, pressure, temperature, air speed, and/or other types of information generated by number of systems 308 may be displayed or otherwise presented to an operator through plurality of control display units 318.

In these illustrative examples, each of plurality of control display units 318 controls number of systems 308. Redundancy may be present in case one of plurality of control display units 318 is unable to perform as desired. Further, all of plurality of control display units 318 may be active without requiring some of plurality of control display units 318 to be inactive in the illustrative embodiments. In this manner, a fewer number of redundant control display units may be used.

In the depicted examples, each of plurality of control display units 318 stores number of parameters 322 used to control number of systems 308. In other words, each control display unit in plurality of control display units 318 stores the same value for each of number of parameters 322.

The different advantageous embodiments recognize and take into account that a change in number of parameters 322 may occur in one of plurality of control display units 318. The different advantageous embodiments provide synchronization system 320 for plurality of control display units 318. Synchronization system 320 may be present in one or more of plurality of control display units 318. Synchronization system 320 takes the form of hardware, software, or a combination of the two.

Synchronization system 320 may be activated in response to a change in number of parameters 322 in one of plurality of control display units 318. For example, in response to a change in number of parameters 322 in one of plurality of control display units 318, synchronization system 320 makes the change in the other control display units in plurality of control display units 318. In other words, number of parameters 322 is synchronized such that number of parameters 322 remains the same for all of plurality of control display units 318.

As a result, if one of plurality of control display units 318 is unable to perform as desired, another control display unit within plurality of control display units 318 may be used without a concern that number of parameters 322 in the other control display unit may not be the same as number of parameters 322 stored in the control display unit in plurality of control display units 318 that is unable to perform as desired.

Additionally, scratchpad system 324 is present in plurality of control display units 318. Scratchpad system 324 may be implemented using hardware, software, or a combination of the two in these examples. Scratchpad system 324 also may be present in one or more of plurality of control display units 318.

Scratchpad system 324 provides a capability to input data 326 in one of plurality of control display units 318 and information 316, such as data 326, sent to one or more other control display units within plurality of control display units 318. This propagation of data 326 occurs without the operator initiating the propagation of data 326 to the other control display units within plurality of control display units 318.

In this manner, an operator may enter data 326 for use with a different system other than the one being controlled currently in the control display unit. With data 326 being sent to other control display units within plurality of control display units 318, the operator or another operator may then enter data 326 in another control display unit within plurality of control display units 318 without having to change the display for the system in number of systems 308 being controlled.

Further, a system within number of systems 308 may be designated for control by any of plurality of control display units 318. As a result, with the placement of plurality of control display units 318 in different locations in an aircraft, the operator may control a desired system from any of plurality of control display units 318.

Also, different operators within aircraft 304 may control different systems within number of systems 308. For example, if one operator of a system within number of systems 308 uses one control display unit within plurality of control display units 318, another operator may provide relief or help to the operator. The second operator may control that system through another control display unit within plurality of control display units 318.

For example, an operator may perform a navigation function using one control display unit. An alert may require that operator to perform operations using an environmental system. Another operator may provide relief and/or additional help to the first operator by the second operator taking control of the navigation function through the control display unit used by the second operator.

The illustration of vehicle control environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, flight management system 312 may be used to guide aircraft 304 along a flight plan. Flight management system 312 also may be considered a system within number of systems 308, depending on the particular implementation.

As another example, some of plurality of control units 314 may not include displays and may not take the form of plurality of control display units 318. In some illustrative examples, some control units in plurality of control units 314 may only provide for user input and may not include a display device or other indicator for output from a system in number of systems 308.

Although the different advantageous embodiments in the illustrative examples are described with respect to an aircraft, the different advantageous embodiments recognize that some advantageous embodiments may be applied to vehicles other than aircraft. These other vehicles may include, for example, without limitation, a submarine, a personnel carrier, a tank, a train, an automobile, a bus, a spacecraft, a surface ship, and/or other suitable vehicles.

Figure 4:
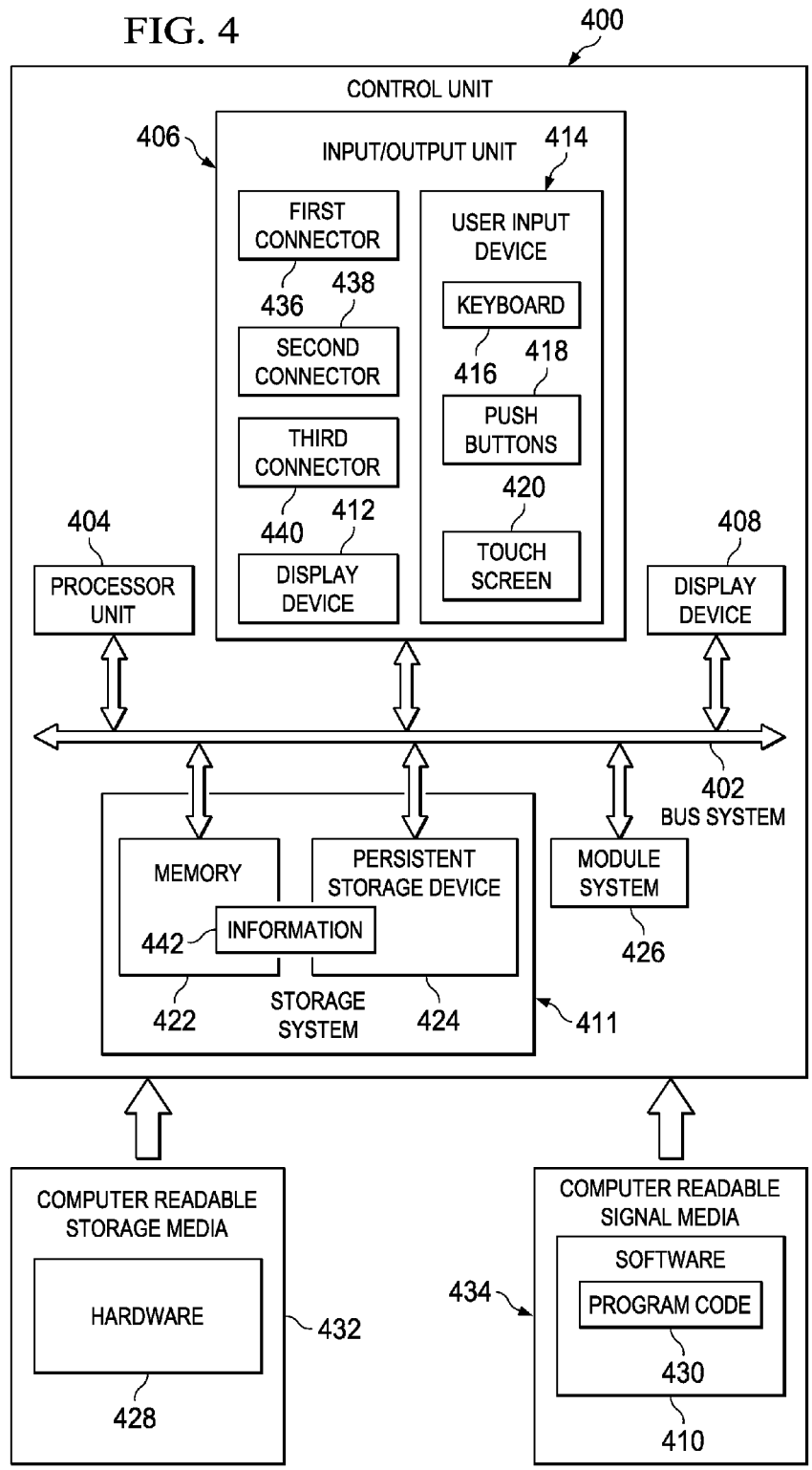
FIG. 4 is an illustration of a block diagram for a control unit in accordance with an advantageous embodiment.

With reference now to FIG. 4, an illustration of a control unit is depicted in accordance with an advantageous embodiment. Control unit 400 is an example of one implementation for a control unit in plurality of control units 314 in FIG. 3.

In this illustrative example, control unit 400 comprises bus system 402, processor unit 404, input/output unit 406, display device 408, and storage system 411. When display device 408 is present, control unit 400 is considered a control display unit within plurality of control display units 318 in FIG. 3.

Bus system 402 provides communication of information between different components in control unit 400. In these illustrative examples, bus system 402 may be one or more buses that carry signals for the information. Processor unit 404 is configured to perform operations with respect to interacting with a system. Processor unit 404 may take the form of a processor configured to execute software 410. Processor unit 404 may be a number of processors, a multi-processor core, or some other type of processor, depending on the particular implementation. Input/output unit 406 provides an interface for an operator to interact with control unit 400.

In these illustrative examples, input/output unit 406 comprises display device 412 and user input device 414. In this illustrative example, user input device 414 takes the form of at least one of keyboard 416, push buttons 418, touch screen 420, and other suitable types of user input devices. When touch screen 420 is used, keys and buttons in keyboard 416 and push buttons 418 may be displayed on touch screen 420. In this type of implementation, touch screen 420 provides an interface for output and input for control unit 400.

Storage system 411 comprises memory 422 and persistent storage device 424 in these depicted examples. Memory 422 may be, for example, a random access memory or any other suitable volatile or non-volatile storage device. Persistent storage device 424 may take various forms, depending on the particular implementation. For example, persistent storage device 424 may be at least one of a hard drive, a flash memory, a rewritable optical disk, or some other suitable type of storage system in which information may be stored in a non-volatile manner.

Additionally, module system 426 is present in control unit 400 in these illustrative examples. Module system 426 includes a number of modules and is configured to provide functionality for control unit 400. Module system 426 may take various forms, such as software 410, hardware 428, or a combination of the two. In some illustrative examples, module system 426 may be integrated circuits or other hardware forming processor unit 404. In other illustrative examples, module system 426 may take the form of program code 430 in software 410. Program code 430 is run by processor unit 404 to perform different operations.

Module system 426 is configured to run processes. These processes are used to control systems, such as number of systems 308 and computer system 310 in FIG. 3. Module system 426 also may include processes used in systems, such as synchronization system 320 and scratchpad system 324 in FIG. 3.

Program code 430 may be stored in persistent storage device 424 and processed by processor unit 404 through memory 422. Program code 430 may be transferred to persistent storage device 424 through a number of different mechanisms. For example, program code 430 may be stored on computer readable storage media 432 and transferred into persistent storage device 424 or connected to persistent storage device 424. Computer readable storage media 432 takes the form of hardware 428. Computer readable storage media 432 may be, for example, without limitation, an optical disk, a magnetic disk, a hard drive, a thumb drive, a flash drive, or some other suitable hardware that is connected to control unit 400.

In other illustrative examples, program code 430 may be transferred to persistent storage device 424 using computer readable signal media 434. Computer readable signal media 434 is, for example, a propagated data signal containing program code 430. Computer readable signal media 434 may be, for example, an optical signal, an electromagnetic signal, an electrical signal, or any other suitable type of signal.

In these illustrative examples, input/output unit 406 also has first connector 436, second connector 438, and third connector 440. First connector 436 is configured to be connected to computer system 310 in FIG. 3. In particular, first connector 436 may be connected to flight management system 312 in computer system 310 in FIG. 3.

As depicted, second connector 438 is configured for connection to another control unit. For example, control unit 400 may be connected to other control units within plurality of control units 314 in FIG. 3. Second connector 438 provides a connection to synchronize information 442 that may be stored in memory 422 and/or persistent storage device 424 in control unit 400.

Third connector 440 is connected to number of systems 308 in FIG. 3. When flight management system 312 in FIG. 3 is considered a system, third connector 440 is not connected to flight management system 312 in FIG. 3 in addition to being connected using first connector 436.

The illustration of control unit 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, control unit 400 may include other functions other than interacting with number of systems 308 and/or flight management system 312 in FIG. 3. For example, control unit 400 may perform functions similar to a flight bag or other type of computer system used in an aircraft or other type of vehicle.

Figure 5:
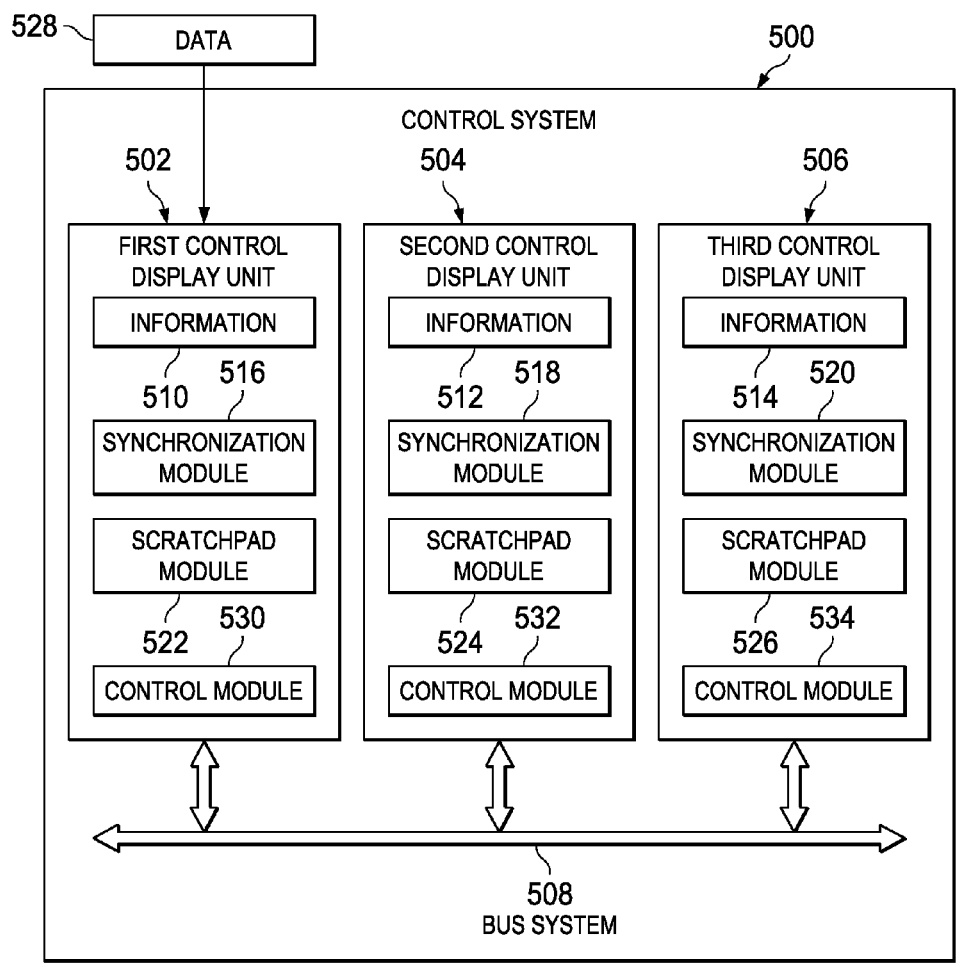
FIG. 5 is an illustration of a block diagram for a control system in accordance with an advantageous embodiment.

With reference now to FIG. 5, an illustration of a control system is depicted in accordance with an advantageous embodiment. Control system 500 is an example of one implementation for control system 306 in FIG. 3.

As depicted, control system 500 includes first control display unit 502, second control display unit 504, and third control display unit 506. First control display unit 502 is configured to interact with the systems in an aircraft in this illustrative example. Second control display unit 504 and third control display unit 506 also are configured to interact with the same systems in the aircraft. For example, first control display unit 502, second control display unit 504, and third control display unit 506 may be configured to interact with number of systems 308 in FIG. 3.

In these illustrative examples, these control display units are connected to each other through bus system 508. Bus system 508 provides communications between first control display unit 502, second control display unit 504, and third control display unit 506. The different control display units may be connected to bus system 508 through a connection, such as second connector 438 in FIG. 4.

As depicted, first control display unit 502 stores information 510, second control display unit 504 stores information 512, and third control display unit 506 stores information 514.

In these illustrative examples, first control display unit 502 has synchronization module 516, second control display unit 504 has synchronization module 518, and third control display unit 506 has synchronization module 520. Synchronization module 516, synchronization module 518, and synchronization module 520 are examples of modules that may be present in module system 426 in control unit 400 in FIG. 4.

Further, synchronization module 516, synchronization module 518, and synchronization module 520 may be part of a synchronization system, such as synchronization system 320 in FIG. 3. In these illustrative examples, these synchronization modules provide for the synchronization of information 510, information 512, and information 514 between first control display unit 502, second control display unit 504, and third control display unit 506.

As a result, a change in information 510 in first control display unit 502 results in the change in information 510 being sent to second control display unit 504 and third control display unit 506. In response, information 512 in second control display unit 504 is updated to have the same values as information 510 in first control display unit 502. In a similar fashion, information 514 in third control display unit 506 is updated to have the same values as information 510 in first control display unit 502. In this manner, first control display unit 502, second control display unit 504, and third control display unit 506 all have the same values for information 510.

Information 510, information 512, and information 514 may take a number of different forms. For example, this information may be at least one of a number of parameters, flight plans, images, and other information that may be synchronized.

Additionally, scratchpad module 522 is present in first control display unit 502, scratchpad module 524 is present in second control display unit 504, and scratchpad module 526 is present in third control display unit 506. In these illustrative examples, scratchpad module 522, scratchpad module 524, and scratchpad module 526 are examples of modules that may be present in module system 426 in control unit 400 in FIG. 4.

Further, scratchpad module 522, scratchpad module 524, and scratchpad module 526 may be part of a scratchpad system, such as scratchpad system 324 in FIG. 3. These scratchpad modules provide a capability for data that is entered into one of the control display units being automatically sent to the other control display units for display and use.

For example, an operator may enter data 528 into first control display unit 502, while first control display unit 502 is interacting with a flight management system. Data 528 may be for use in changing a parameter in information 510 for a system within a number of systems in the aircraft. In these illustrative examples, data 528 is sent to at least one of second control display unit 504 and third control display unit 506.

The operator may then use second control display unit 504 or third control display unit 506 to change a parameter within information 510 using data 528. This may be performed in a manner such that the display on first control display unit 502 does not change. After data 528 has been used, data 528 may be removed from first control display unit 502, second control display unit 504, and third control display unit 506 without requiring the operator to perform an operation to remove data 528.

Control module 530 is present in first control display unit 502, control module 532 is present in second control display unit 504, and control module 534 is present in third control display unit 506. Control module 530, control module 532, and control module 534 are examples of control modules that may be implemented in module system 426 in control unit 400 in FIG. 4.

In these illustrative examples, these control modules provide a capability for an operator to transfer control of one system from one control display unit to another control display unit. This transfer of control of a system from one control display unit to another control display unit may provide a capability for one operator to obtain assistance from another operator, while operating an aircraft or another vehicle.

For example, an operator may adjust a flight plan for an aircraft using first control display unit 502 to control a flight management system. That operator may identify an alert to change a radio frequency for a communications system. If the operator has not finished making adjustments to the flight plan when the alert to change to the radio frequency is identified, that operator may pass control of the flight management system from first control display unit 502 to second control display unit 504 at which another operator is present who can provide assistance. In this manner, the first operator may take care of changing the radio frequency for the communications system using first control display unit 502, while the second operator finishes adjusting the flight plan using second control display unit 504 to control the flight management system.

For example, first control display unit 502 may be located near a pilot, while second control display unit 504 may be located near a relief pilot in aircraft 304 in FIG. 3. If the relief pilot desires to perform some operations to help the pilot, second control display unit 504 may be configured to control a particular system in number of systems 308 in FIG. 3.

The illustration of control system 500 in FIG. 5 is not meant to imply physical or architectural limitations to the manner in which different control systems may be implemented. Control system 500 is presented as one manner in which control system 306 in FIG. 3 may be implemented. For example, other control systems may include additional control display units in addition to first control display unit 502, second control display unit 504, and third control display unit 506. Although three control display units were illustrated in control system 500 in FIG. 5, other numbers of control display units may be employed. For example, two, four, seven, or some other number of control display units may be present in control system 500 in FIG. 5. These additional control display units may be active or inactive, depending on the particular implementation.

Figure 6:
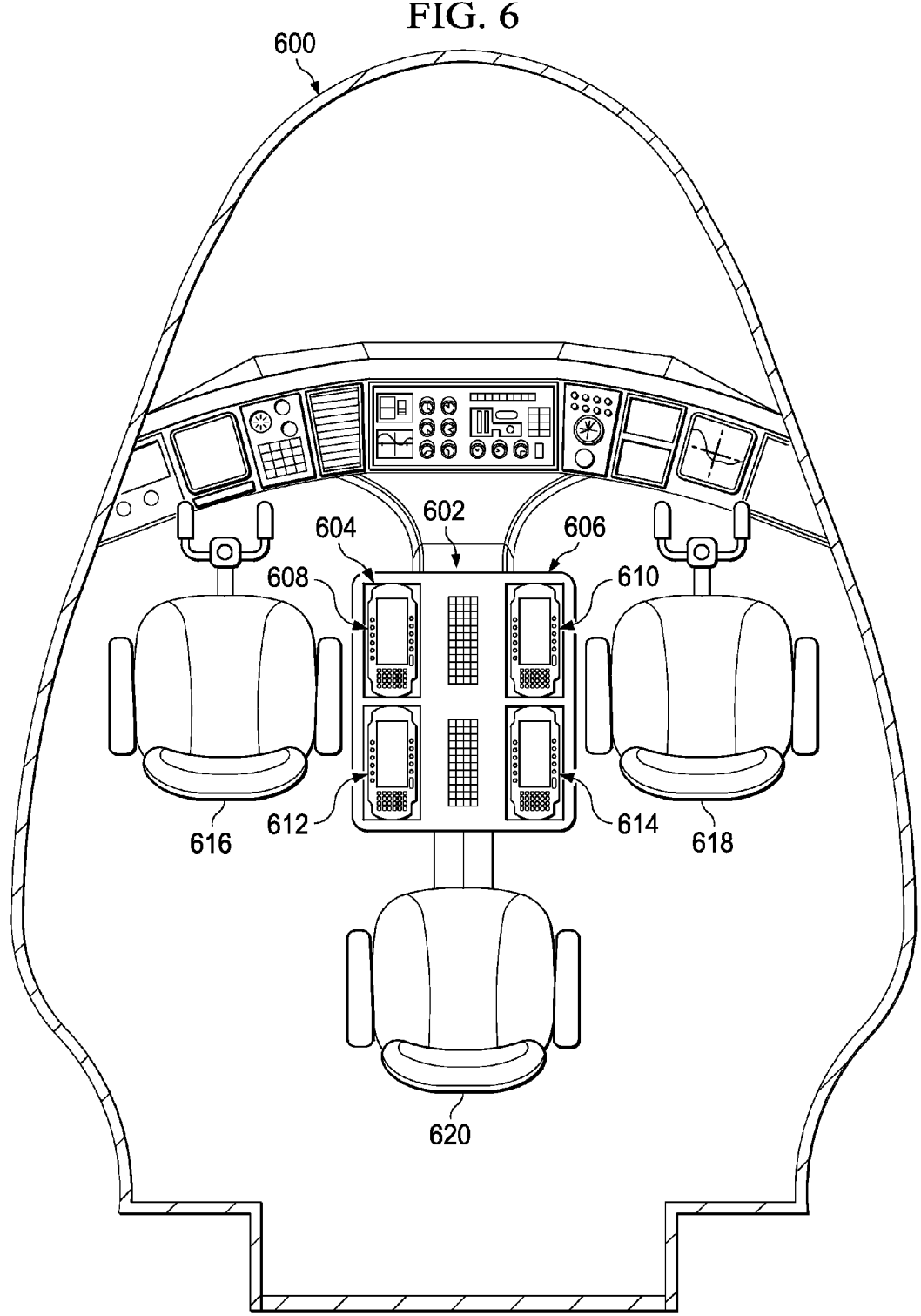
FIG. 6 is an illustration of a control system in an aircraft in accordance with an advantageous embodiment.

With reference now to FIG. 6, an illustration of a control system in an aircraft is depicted in accordance with an advantageous embodiment. In this illustrative example, cockpit 600 is an example of a location in which control system 602 may be present. Control system 602 is an example of an implementation for control system 500 in FIG. 5.

In this illustrative example, plurality of control display units 604 is associated with aisle stand 606. In this illustrative example, plurality of control display units 604 includes control display unit 608, control display unit 610, control display unit 612, and control display unit 614. Control display unit 608, control display unit 610, and control display unit 612 are active control display units that are used during operation of the aircraft.

Control display unit 614 is a spare control display unit that may be inactive. Of course, in some illustrative examples, control display unit 614 may be omitted, depending on the particular implementation.

Control display unit 608, control display unit 610, and control display unit 612 are positioned on aisle stand 606 in a manner that allows each operator to access a display control unit with a desired level of ergonomics. In this illustrative example, chair 616, chair 618, and chair 620 are positioned around aisle stand 606. As depicted, chair 616 is to the left of aisle stand 606, while chair 618 is to the right of aisle stand 606. Chair 620 is behind aisle stand 606 in these illustrative examples.

Any one of control display units 608, 610, 612, and 614 may be used to interact with any of the systems within the aircraft in these illustrative examples.

Data entered using a scratchpad function for a system in the aircraft at control display unit 608 may be displayed at control display unit 610 and control display unit 612. In this manner, other information for a different system displayed in control display unit 608 may remain, while allowing the operator or another operator to enter the data into the correct system using control display unit 610 and/or control display unit 612 in these illustrative examples.

For example, an operator in chair 616 may enter a radio frequency for a radio voice system into a scratchpad function at control display unit 608. This radio frequency may be entered, while navigation information is displayed in control display unit 608. The radio frequency is also sent to control display unit 610 and control display unit 612 in these examples. The same operator or another operator may use control display unit 610 or control display unit 612 to change the frequency for the radio voice system without changing the display of navigation information at control display unit 608. After the radio frequency has been changed, the data entered into the scratchpad may be removed from all of the control display units.

The illustration of control system 602 in cockpit 600 is only meant as one example of an implementation of control system 306 in aircraft 304 in FIG. 3. In other illustrative examples, control display units may be present in other areas of an aircraft for use by other operators of the aircraft.

In still other illustrative examples, control display unit 614 may be omitted or additional control display units may be present, depending on the particular implementation. Further, in some illustrative examples, a control display unit may be located on the wall of the cockpit, rather than on aisle stand 606, depending on the desired ergonomics and the location of the operators during operation of the aircraft.

Figure 7:
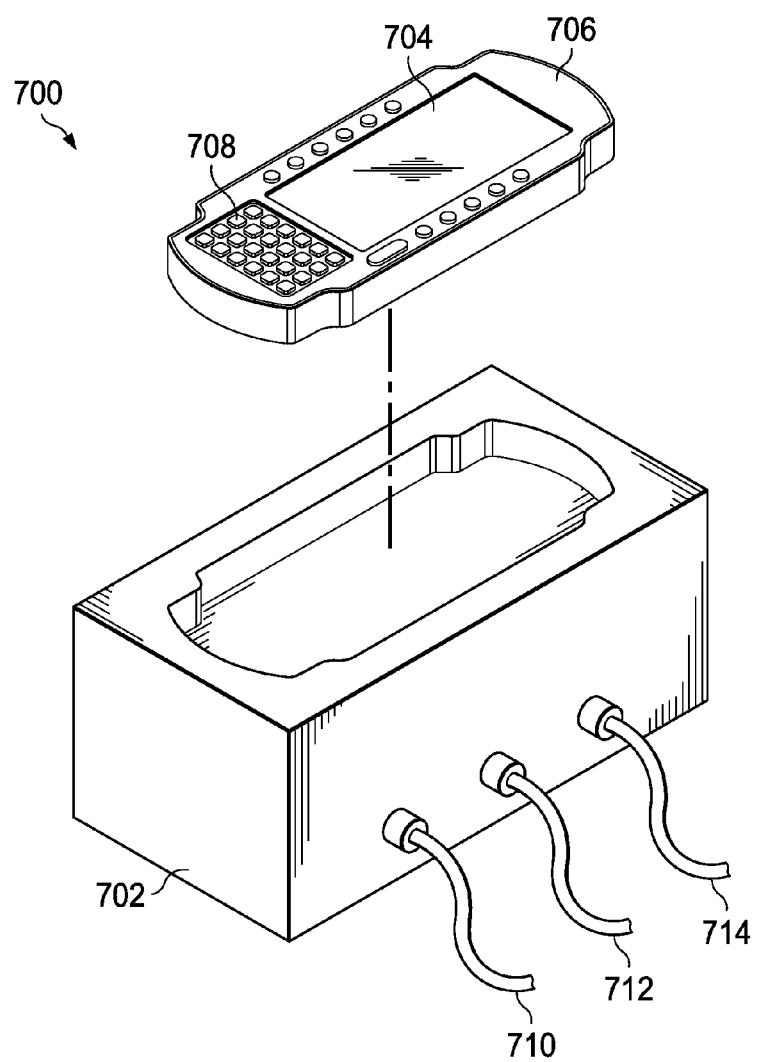
FIG. 7 is an illustration of a control display unit in accordance with an advantageous embodiment.

With reference now to FIG. 7, an illustration of a control display unit is depicted in accordance with an advantageous embodiment. In this illustrative example, control display unit 700 is an example of one implementation of control unit 400 in FIG. 4.

As depicted, control display unit 700 comprises housing 702 and display 704. Housing 702 may include components, such as bus system 402, processor unit 404, storage system 411, and/or other suitable components in control unit 400 in FIG. 4. Display 704 includes display device 706 and keys 708. Display device 706 is configured to display information. Keys 708 are configured to allow a user to enter information into control display unit 700.

Additionally, housing 702 has connector 710, connector 712, and connector 714. Connector 710 is configured to be connected to a computer system, such as flight management system 312 in FIG. 3. Connector 712 is configured to be connected to a bus system, such as bus system 508 in FIG. 5. This bus system provides a connection between different computer display units. Connector 714 is configured to be connected to a number of systems, such as number of systems 308 in FIG. 3 in these examples.

Figure 8:
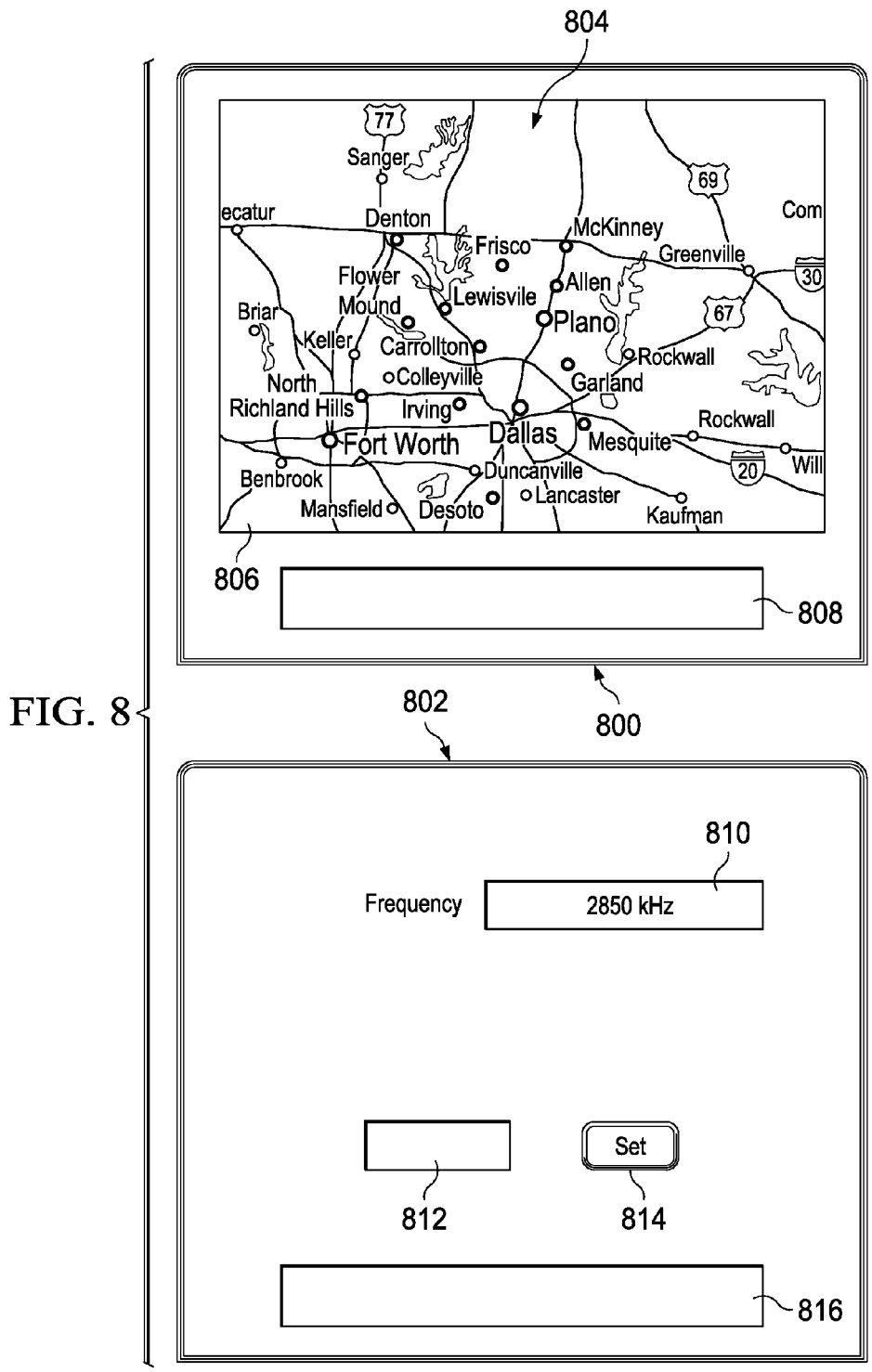
FIG. 8 is an illustration of displays on display devices for control display units in accordance with an advantageous embodiment.

With reference now to FIG. 8, an illustration of displays on display devices for control display units is depicted in accordance with an advantageous embodiment. In this illustrative example, display 800 is a display on a display device for one control display unit, while display 802 is a display on a display device for another control display unit. In this particular example, display 800 includes map 804 within area 806. Field 808 provides a display of data or other information that may be entered by a user using a scratchpad function in these illustrative examples.

In display 802, a frequency for voice communications is displayed in field 810. The frequency displayed in field 810 may be changed by entering a new frequency in field 812 and selecting set button 814. Field 816 provides a display of data or other information that may be entered by a user using a scratchpad function in these illustrative examples.

Figure 9:
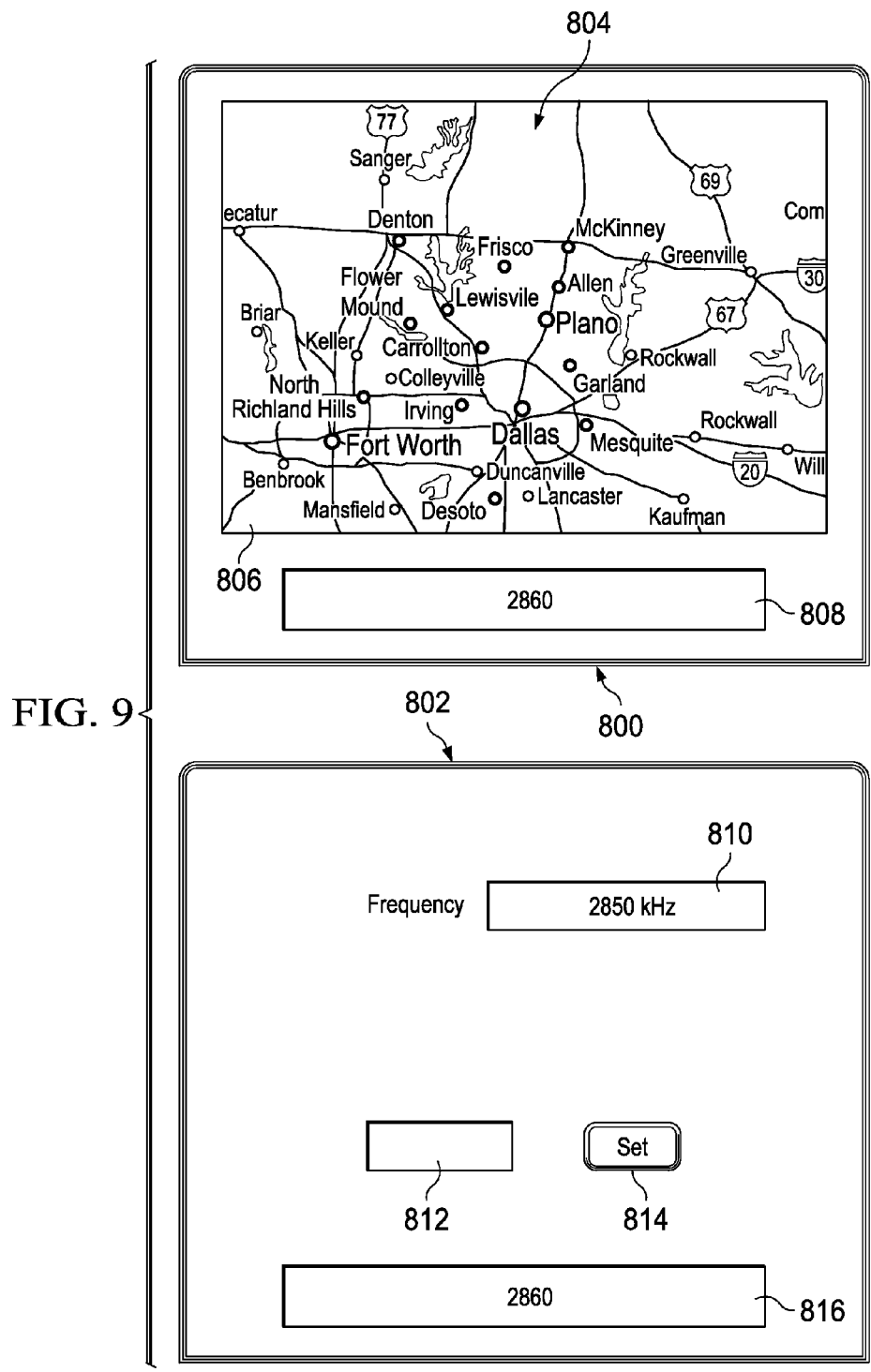
FIG. 9 is an illustration of the entry of data in control display units in accordance with an advantageous embodiment.

Turning now to FIG. 9, an illustration of the entry of data in control display units is depicted in accordance with an advantageous embodiment. In this illustrative example, frequency value 2860 is entered into field 808. In this example, this value is automatically sent to display 802, as can be seen by the same value in field 816.

An operator may then change the frequency using field 812 in display 802 without having to change display 800. As a result, an operator may still view map 804 along with any other flight information without having to change the functionality of the control display unit on which display 800 is present. After the new frequency has been entered into field 812, frequency 2860 is automatically removed from both field 808 and field 816.

Figure 10:
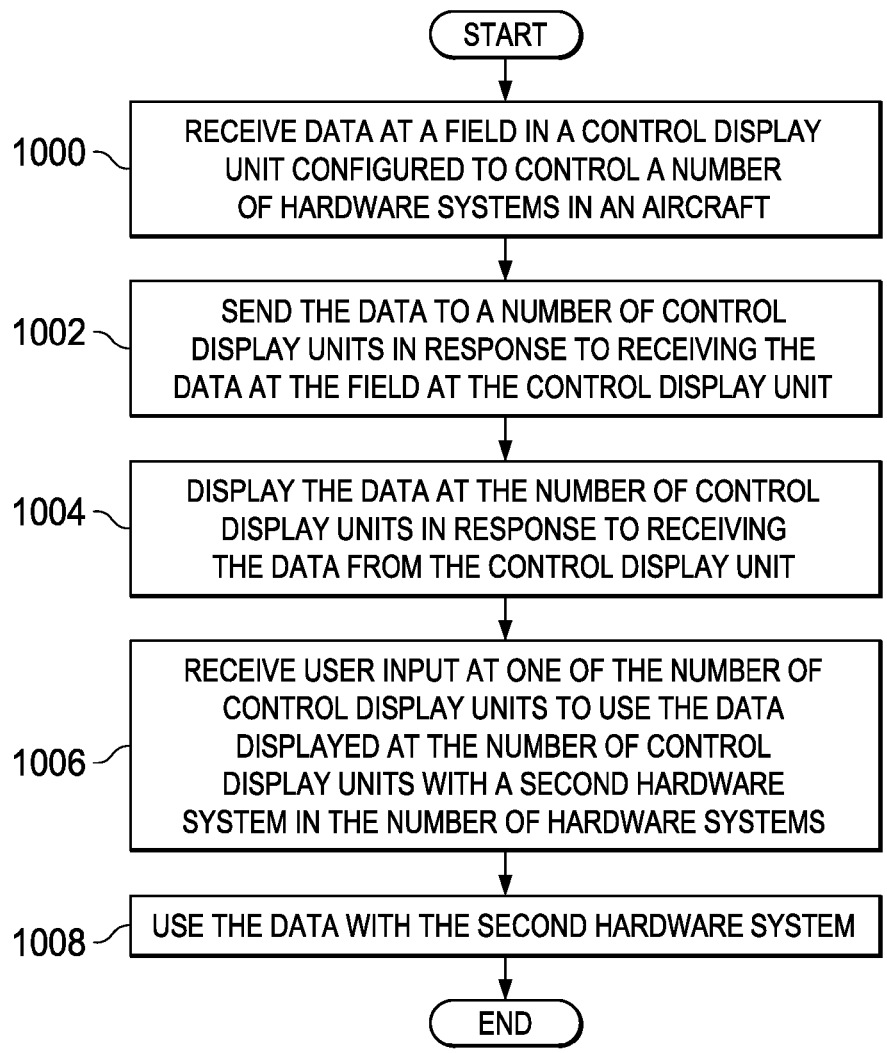
FIG. 10 is an illustration of a flowchart of a process for operating an aircraft in accordance with an advantageous embodiment.

With reference now to FIG. 10, an illustration of a flowchart of a process for operating an aircraft is depicted in accordance with an advantageous embodiment. The process illustrated in FIG. 10 may be implemented in software, hardware, or a combination of the two. This process may be implemented using control system 306 in FIG. 3.

The process begins by receiving data at a field in a control display unit configured to control a number of hardware systems in an aircraft (operation 1000). The control display unit may be one of plurality of control display units 318 in FIG. 3. The control display unit is currently controlling a first hardware system in the number of hardware systems. The data received at the field may be data entered through user input using, for example, without limitation, a scratchpad function.

The process sends the data to a number of control display units in response to receiving the data at the field at the control display unit (operation 1002). The number of control display units may be one or more other control display units in plurality of control display units 318 in FIG. 3. In operation 1002, the data is sent to the number of control display units through a bus system.

Thereafter, the data is displayed at the number of control display units in response to receiving the data from the control display unit (operation 1004). The data may be displayed in a number of fields at the number of control display units. Next, the process receives user input at one of the number of control display units to use the data displayed at the number of control display units with a second hardware system in the number of hardware systems (operation 1006).

In operation 1006, the user input may be, for example, an entry of a value for a parameter for the second hardware system to change a current value for the parameter to the value entered. The process then uses the data with the second hardware system (operation 1008), with the process terminating thereafter. In operation 1008, using the data may include, for example, changing the parameter for the second hardware system to the value entered through user input.

Figure 11:
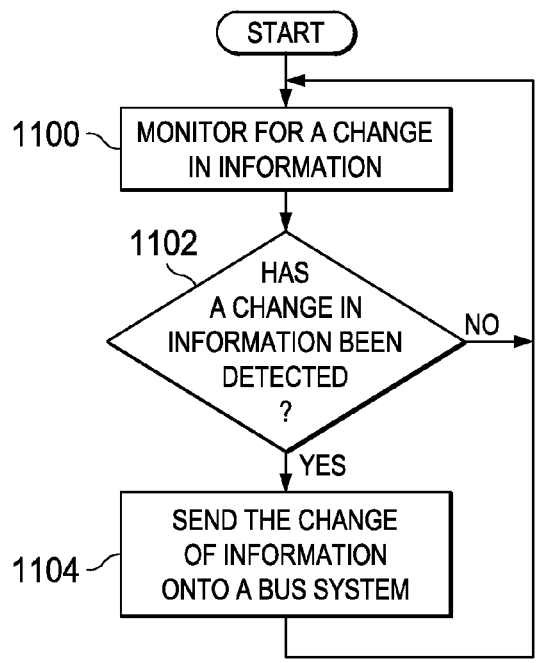
FIG. 11 is an illustration of a flowchart of a process for synchronizing information in a control system in accordance with an advantageous embodiment.

With reference now to FIG. 11, an illustration of a flowchart of a process for synchronizing information in a control system is depicted in accordance with an advantageous embodiment. The process illustrated in FIG. 11 may be implemented in software, hardware, or a combination of the two. This process may be implemented in synchronization system 320 in FIG. 3. In particular, this process may be found in a synchronization module, such as synchronization module 516 in first control display unit 502 in FIG. 5.

The process begins by monitoring for a change in information (operation 1100). In operation 1100, the information is information stored by a control unit. In this example, the control unit may be first control display unit 502 in FIG. 5. This information may be, for example, parameters for controlling a hardware system. In one example, the parameter may be a radio frequency, an altitude, a way point, or some other suitable type of parameter.

A determination is made as to whether a change in information has been detected (operation 1102). If a change in information has not been detected, the process returns to operation 1100. If a change in information is detected, the process sends the change of information onto a bus system (operation 1104). In this example, the bus system is bus system 508 in FIG. 5. In this manner, the information may be sent to other control display units to keep the control display units synchronized. In operation 1104, the information is sent in a manner that allows the other control display units to identify what updates should be made. Thereafter, the process returns to operation 1100.

Figure 12:
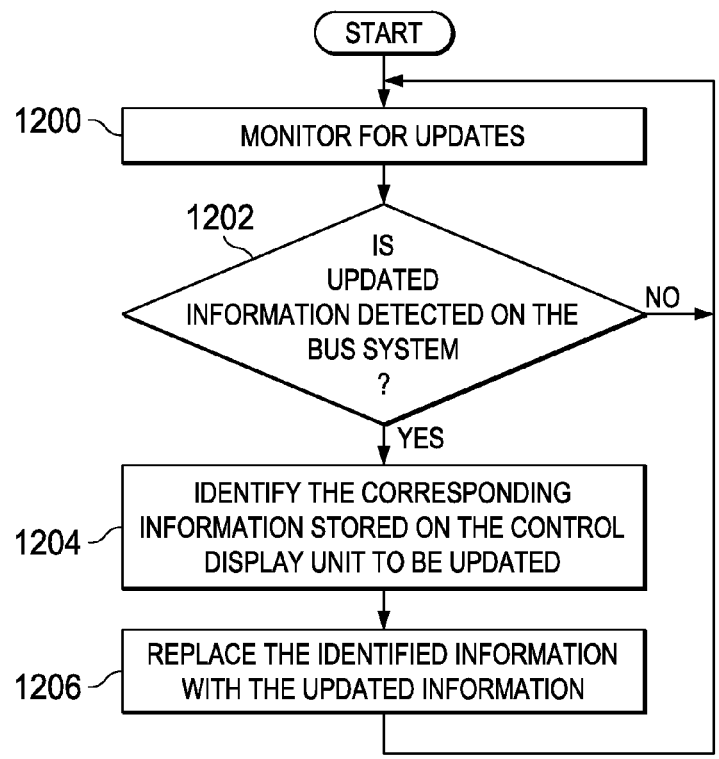
FIG. 12 is an illustration of a flowchart of a process for synchronizing information in accordance with an advantageous embodiment.

With reference now to FIG. 12, an illustration of a flowchart of a process for synchronizing information is depicted in accordance with an advantageous embodiment. In this illustrative example, the process may be implemented in hardware, software, or a combination of the two. In particular, this process may be implemented in plurality of control units 314 in FIG. 3. As one illustrative example, this process may be implemented in synchronization module 518 in second control display unit 504 in FIG. 5.

The process begins by monitoring for updates (operation 1200). In these illustrative examples, the process monitors a bus system connecting the control display units to each other. In this example, the bus system may be bus system 508 in FIG. 5.

A determination is made as to whether updated information is detected on the bus system (operation 1202). In one illustrative example, the updated information may be the information sent onto the bus system in operation 1104 in FIG. 11. For example, the updated information may be a change to a parameter for a system on the aircraft sent onto the bus system by first control display unit 502 in FIG. 5. If updated information is not detected, the process returns to operation 1200.

When updated information is detected on the bus system in operation 1202, the process identifies the corresponding information stored on the control display unit to be updated (operation 1204). Thereafter, the process replaces the identified information with the updated information (operation 1206), with the process then returning to operation 1200.

In some cases, acknowledgments may be returned to indicate that the information has been received and updated on the control display unit.

Figure 13:
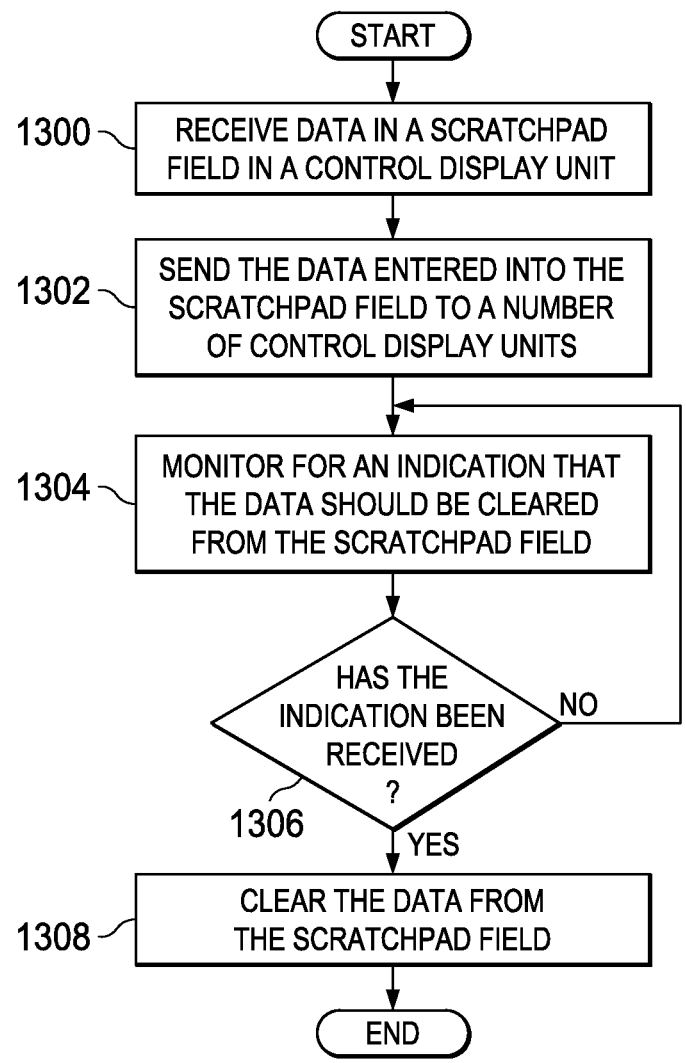
FIG. 13 is an illustration of a flowchart of a process for entering data using a scratchpad system in accordance with an advantageous embodiment.

With reference now to FIG. 13, an illustration of a flowchart of a process for entering data using a scratchpad system is depicted in accordance with an advantageous embodiment. This process may be implemented using hardware, software, or a combination of the two. In these illustrative examples, this process may be implemented in scratchpad system 324 in FIG. 3. In particular, one or more of the operations may be implemented in a scratchpad module, such as scratchpad module 522 in first control display unit 502 in FIG. 5.

The process begins by receiving data in a scratchpad field in a control display unit (operation 1300). The scratchpad field may take the form of field 808 in FIG. 8 in one illustrative example. The process sends the data entered into the scratchpad field to a number of control display units (operation 1302). The process then monitors for an indication that the data should be cleared from the scratchpad field (operation 1304). A determination is made as to whether the indication has been received (operation 1306). If the indication has not been received, the process returns to operation 1304. Otherwise, the process clears the data from the scratchpad field (operation 1308), with the process terminating thereafter.

Figure 14:
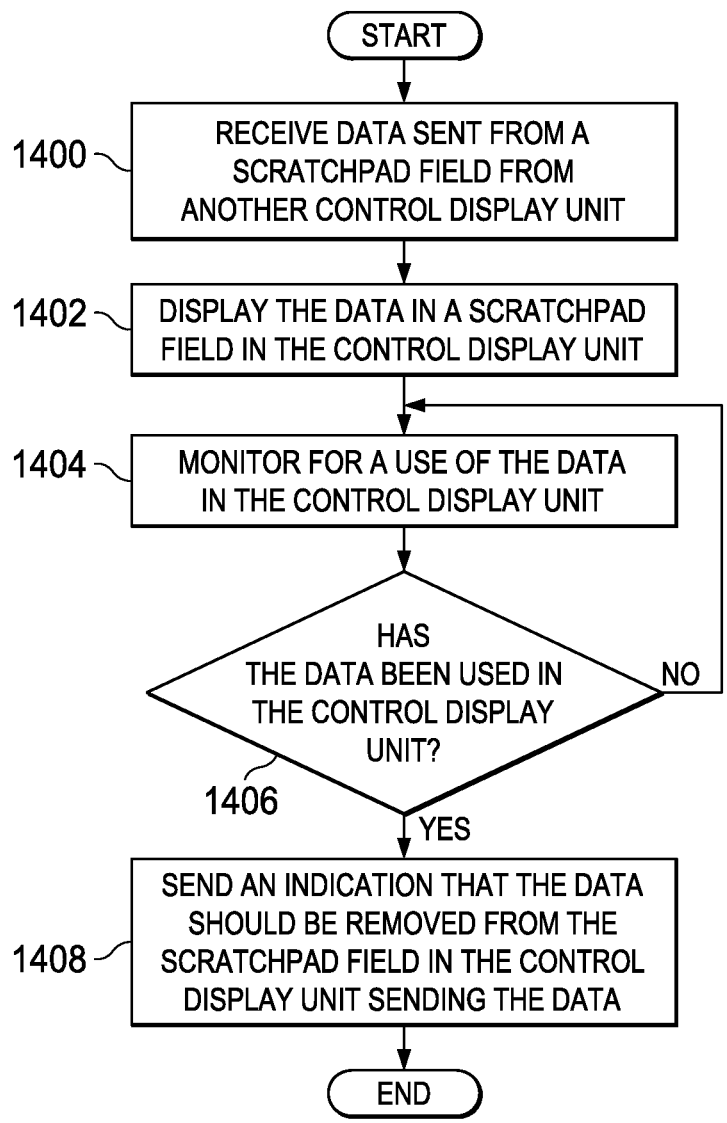
FIG. 14 is an illustration of a flowchart of a process for using data in a scratchpad system in accordance with an advantageous embodiment.

With reference now to FIG. 14, an illustration of a flowchart of a process for using data in a scratchpad system is depicted in accordance with an advantageous embodiment. This process may be used in scratchpad system 324 in FIG. 3. In particular, the process may be implemented in a scratchpad module, such as scratchpad module 522 in first control display unit 502 in FIG. 5.

The process begins by receiving data sent from a scratchpad field from another control display unit (operation 1400). Thereafter, the process displays the data in a scratchpad field in the control display unit (operation 1402).

The process then monitors for a use of the data in the control display unit (operation 1404). The use of the data may be, for example, without limitation, the data being entered into another scratchpad field in the control display unit to change a value for a parameter for a system in the aircraft.

A determination is made as to whether the data has been used in the control display unit (operation 1406). If the data has not been used, the process returns to operation 1404. Otherwise, the process sends an indication that the data should be removed from the scratchpad field in the control display unit sending the data (operation 1408), with the process terminating thereafter.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for a control system for an aircraft. In one advantageous embodiment, an apparatus comprises a bus system and a plurality of control units connected to the bus system. The plurality of control units is configured to control a same number of hardware systems in a vehicle. The plurality of control units also may store a number of parameters used to control the number of hardware systems and synchronize the number of parameters stored using the bus system. This synchronization may occur in response to a change in the number of parameters at a selected control unit in the plurality of control units.

In this manner, the different advantageous embodiments provide a control system that provides improved ergonomics for operators of an aircraft. Further, the different advantageous embodiments provide a control system that allows one or more operators to use different control display units to control the same systems on the aircraft. In this manner, an operator may provide relief and/or help to another operator during operation of the aircraft. The different advantageous embodiments may reduce the time needed to operate the aircraft. Further, the different advantageous embodiments may reduce the cost, weight, and/or number of components needed to operate the aircraft. The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A control system for an aircraft comprising:
    a first control display unit configured to be accessible in a first location in the aircraft and receive an input to change a current value for a parameter that controls a number of hardware systems in the aircraft, such that the number of hardware systems comprises: a propulsion system, a hydraulic system, and an environmental system; and
    a second control display unit configured to be accessible in a second location in the aircraft and control the number of hardware systems in the aircraft, wherein the second control display unit is in communication with the first control display unit, wherein a number of parameters for a hardware system in the number of hardware systems is stored in the first control display unit and in the second control display unit, and such that the first control display unit and the second control display unit are each configured to synchronize the number of parameters stored in the first control display unit and the second control display unit.

2. The control system of claim 1, wherein the first control display unit and the second control display unit are configured to synchronize the number of parameters stored in the first control display unit and the second control display unit in response to a change in any parameter in the number of parameters in one of the first control display unit and the second control display unit.

3. The control system of claim 2, wherein the first control display unit is configured to receive user input for the hardware system in the number of hardware systems and send the user input to the second control display unit in response to receiving the user input.

4. The control system of claim 3, wherein the second control display unit is configured to change the parameter for the hardware system using the user input received from the first control display unit and clear the user input from the first control display unit in response to the change in the parameter for the hardware system in the second control display unit.

5. The control system of claim 1 further comprising:
    a third control display unit configured to control the number of hardware systems, wherein the first control display unit, the second control display unit, and the third control display unit are configured to synchronize the number of parameters in response to a change in the number of parameters in one of the first control display unit and the second control display unit.

6. The control system of claim 5 further comprising:
    a bus system, wherein the first control display unit, the second control display unit, and the third control display unit communicate with each other using the bus system.

7. The control system of claim 6, wherein the first control display unit has a first connector to a flight management system that is separate from the number of hardware systems, a second connector to the bus system, and a third connector to the number of hardware systems.

8. The control system of claim 1, wherein the first control display unit comprises a module system, a user input device, and a display device.

9. The control system of claim 1 further comprising:
a flight management system, wherein the first control display unit and the second control display unit are in communication with the flight management system and configured to send input from an operator to the flight management system, receive output from the flight management system, and display the output received from the flight management system.

10. The control system of claim 1, wherein the number of hardware systems further comprises: an entertainment system, a radio voice communication system, a satellite communications system, a weather radar system, a ground proximity warning system, and a cabin intercom system.

11. The control system of claim 1, further configured with the first control display unit and the second control display unit being simultaneously accessible to a single user in a chair in a cockpit.

12. An apparatus comprising:
a bus system; and
a plurality of control display units connected to the bus system, wherein the plurality of control display units are each configured to be accessible at a unique location in a vehicle and receive an input to change a current value for a parameter that controls a same number of hardware systems in the vehicle, such that the number of hardware systems comprises: a propulsion system, a hydraulic system, a radio voice communication system, a satellite communication system, a weather radar system, a ground proximity warning system, and an environmental system, store a number of parameters used to control the number of hardware systems, and synchronize the number of parameters stored using the bus system in response to a change in the number of parameters at a selected control unit in the plurality of control units.

13. The apparatus of claim 12, wherein the plurality of control display units each have a first connector to a flight management system, a second connector to the bus system, and a third connector to the number of hardware systems.

14. The apparatus of claim 12, wherein a first control display unit in the plurality of control display units is configured to receive data for use with a first hardware system in the number of hardware systems while controlling a second hardware system and send the data to a second control display unit, and wherein the second control unit is configured to receive the data from the first control display unit, control the second hardware system using the data, and cause the first control display unit to delete the data in response to the first control display unit using the data to control the first hardware system.

15. The apparatus of claim 12, wherein the vehicle is selected from one of an aircraft, a submarine, a personnel carrier, a tank, a train, an automobile, a bus, a spacecraft, and a surface ship.

16. A method for operating an aircraft, the method comprising:
receiving data at a field in a control display unit configured to be accessible at a unique location in the aircraft and receive an input to change a current value for a parameter that controls a number of hardware systems in the aircraft, wherein the control display unit is currently controlling a first hardware system in the number of hardware systems, wherein the number of hardware systems comprises a propulsion system, a hydraulic system, and an environmental system;
sending the data to a number of control display units in response to receiving the data in the field at the control display unit, wherein the number of control display units is configured to control the number of hardware systems for the aircraft;
displaying the data at the number of control display units in response to receiving the data from the control display unit; and
responsive to receiving a user input at one of the number of control display units to use the data displayed at the number of control display units with a second hardware system in the number of hardware systems, using the data with the second hardware system.

17. The method of claim 16 further comprising:
responsive to using the data with the second hardware system, removing the data from the control display unit and the number of control display units.

18. The method of claim 16, wherein the control display unit displays the data for the first hardware system and wherein a display of the data for the first hardware system remains displayed on the control display unit while the data is used with the second hardware system.

19. The method of claim 16, wherein the step of using the data with the second hardware system comprises:
changing the parameter for the second hardware system based on the data.

20. The method of claim 19, wherein the parameter is stored in the control display unit and in the number of control display units and further comprising:
responsive to the change in the parameter for the second hardware system, synchronizing the parameter stored in the control display unit and in the number of control display units such that the parameter has a same value in the control display unit and in the number of control display units.

* * * * *